United States Patent
Mitsutake

(10) Patent No.: US 7,461,356 B2
(45) Date of Patent: Dec. 2, 2008

(54) FUNCTION CONTROL UNIT AND METHOD THEREOF

(75) Inventor: Katsuya Mitsutake, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 777 days.

(21) Appl. No.: 10/386,442

(22) Filed: Mar. 13, 2003

(65) Prior Publication Data

US 2004/0021704 A1 Feb. 5, 2004

(30) Foreign Application Priority Data

Jun. 3, 2002 (JP) ............................. 2002-161271

(51) Int. Cl.
G06F 3/00 (2006.01)
(52) U.S. Cl. .................. 715/865; 715/702; 715/866; 345/173; 341/21
(58) Field of Classification Search ......... 715/864–866, 715/701, 702, 728, 729, 700; 345/173–177; 341/5, 21, 26, 27, 31–34
See application file for complete search history.

(56) References Cited

U.S. PATENT DOCUMENTS

| | | | | |
|---|---|---|---|---|
| 4,686,332 A | * | 8/1987 | Greanias et al. ............ | 345/173 |
| 4,845,346 A | * | 7/1989 | Ouchi et al. ................ | 250/221 |
| 5,119,079 A | * | 6/1992 | Hube et al. ................. | 715/823 |
| 5,479,528 A | | 12/1995 | Speeter | |
| 5,638,438 A | * | 6/1997 | Keen .......................... | 379/354 |
| 5,825,352 A | * | 10/1998 | Bisset et al. ................ | 345/173 |
| 5,856,824 A | | 1/1999 | Shieh | |
| 6,067,079 A | | 5/2000 | Shieh | |
| 6,236,037 B1 | * | 5/2001 | Asada et al. ................ | 250/221 |
| 6,351,705 B1 | * | 2/2002 | Yoshioka .................... | 701/200 |
| 6,474,547 B1 | | 11/2002 | Suzuki | |
| 6,590,584 B1 | * | 7/2003 | Yamaura et al. ........... | 715/704 |
| 6,611,258 B1 | * | 8/2003 | Tanaka et al. .............. | 345/179 |
| 6,630,928 B1 | * | 10/2003 | McIntyre et al. ........... | 345/173 |
| 6,653,948 B1 | * | 11/2003 | Kunimatsu et al. ..... | 340/995.19 |
| 6,757,002 B1 | * | 6/2004 | Oross et al. ................ | 715/864 |
| 6,788,294 B2 | * | 9/2004 | Takala et al. ............... | 345/173 |
| 7,068,260 B2 | * | 6/2006 | Hill ............................. | 345/173 |
| 7,254,775 B2 | * | 8/2007 | Geaghan et al. ........... | 715/701 |
| 2002/0041386 A1 | * | 4/2002 | Suzuki et al. .............. | 358/1.13 |
| 2005/0179565 A1 | * | 8/2005 | Mase et al. ................. | 341/21 |

FOREIGN PATENT DOCUMENTS

| | | |
|---|---|---|
| JP | A 5-158607 | 6/1993 |
| JP | A 5-324987 | 12/1993 |
| JP | A-6-83523 | 3/1994 |
| JP | A 7-319623 | 12/1995 |
| JP | A 8-297542 | 11/1996 |
| JP | A 9-265352 | 10/1997 |
| JP | A-10-63424 | 3/1998 |
| JP | A-10-63425 | 3/1998 |
| JP | A-2001-148046 | 5/2001 |

\* cited by examiner

*Primary Examiner*—Tadeese Hailu
(74) *Attorney, Agent, or Firm*—Oliff & Berridge, PLC

(57) ABSTRACT

Positions of the user's fingers placed on a touch panel are detected, and buttons are arranged at the detected positions so that the buttons can be used for selecting a function. Due to the foregoing, even when a visually handicapped user does not memorize the button positions, it is possible for the user to conduct operation. It is possible to provide a user interface environment in which the visually handicapped user can conduct operation highly effectively without using specific parts.

20 Claims, 10 Drawing Sheets

----- : LINE CAPABLE OF BEING DISTINGUISHED BY SENSE OF TOUCH
⊘ : POINT CAPABLE OF BEING DISTINGUISHED BY SENSE OF TOUCH

FUNCTION CONTROL UNIT AND METHOD THEREOF

BACKGROUND OF THE INVENTION

The present invention relates to a function control unit for executing a function when the function control unit receives operation conducted by a user. The present invention also relates to a method thereof.

Nowadays, a user interface device, in which a touch panel key switch and a display are combined with each other, is applied to an office apparatus such as a copier, a ticket vending machine such as a train ticket vending machine and an information guide apparatus arranged in a public space.

In the user interface described above, for the reasons that many functions are operated and many types of information are displayed on the user interface, the user interface is composed in such a manner that positions of the operation buttons can be changed and correspondence of the buttons with the functions can be changed.

In this case, there is a social demand of making operation of the above office apparatus easy for visually handicapped persons.

For example, in the United States, according to item 508 in which the law relating to accessibility is stipulate, it is necessary that the keys to be mechanically operated can be distinguished by the sense of touch.

In order to meet the above demand, for example, the Unexamined Japanese Patent Application Publication No. Hei5-324987 (Document 1) discloses a method in which a set-top-box having keys for visually handicapped persons, which is different from the touch panel, is arranged so that both of them can be changed over.

However, according to the method disclosed in Document 1, the keys in the set-top-box are not programmable. Therefore, the operable functions are limited. Accordingly, each time the functions are added or changed, it is necessary to manufacture a new set-top-box.

The Unexamined Japanese Patent Application Publication No. Hei5-158607 (Document 2) discloses a method in which Braille points are actively formed by heating elements or mechanically movable portions.

However, the mechanism to realize the invention disclosed in Document 2 is complicated and expensive.

Further, users unfamiliar with Braille points can not use the apparatus to which this method is applied.

The Unexamined Japanese Patent Application Publication Nos. Hei7-319623 and Hei9-265352 (Documents 3 and 4) disclose a method in which irregularities corresponding to the keys displayed on the touch panel are provided.

However, since layout of the touch panel is different according to the type of the apparatus, when the method disclosed in Documents 3 and 4 is employed, it is necessary to prepare a different touch panel for each type of the apparatus, which raises the manufacturing cost of the touch panel.

For example, when characters and keys are displayed being enlarged for the sake of weak-sighted persons, irregularities on the touch panel are shifted from the display. Therefore, it becomes impossible to guide operation by utilizing these irregularities.

The Unexamined Japanese Patent Application Publication No. Hei8-297542 (Document 5) discloses a method in which lattice-line-shaped irregularities are provided on the operation face of the touch panel so that positions on the operation face can be distinguished by the sense of touch and further a voice guidance is conducted.

However, according to the method disclosed in Document 5, a user must memorize the coordinate, which has been guided by a voice, and trace a lattice-line.

Accordingly, when this method is employed, it takes time to operate the apparatus. Further, when the user forgets the content of the guidance, it is impossible for him to operate the apparatus.

SUMMARY OF THE INVENTION

The present invention is accomplished to solve the above problems of the prior art. It is an object of the present invention to provide a function control unit and a method thereof capable of being easily applied to each of the different type apparatus.

It is another object of the present invention to provide a function control unit and a method thereof capable of being easily controlled by visually handicapped persons.

[Function Control Unit]

In order to accomplish the above objects, the present invention provides a function control unit comprising: an operating position detector for detecting a first operating position, the number of which is one or more, at which a first operation, the number of which is one or more, is respectively conducted on an operation face on which operation is received from the outside; a function correspondence making section for making the first operating position detected before, the number of which is one or more, respectively correspond to a predetermined function, the number of which is one or more; an operation detector for detecting a second operation for the first operating position, the number of which is one or more; and a function execution controller for controlling the execution of the function which is made to correspond to the first operating position, the number of which is one or more, on which the second operation is conducted.

Preferably, the function control unit comprises a touch panel for receiving operation via the operation face.

Preferably, the touch panel includes a position display, the number of which is one or more, for respectively displaying a position, the number of which is one or more, on the operation face of the touch panel by the sense of touch.

Preferably, the first operation includes operation for pointing a position on the operation face, the number of which one or more, and the operating position detector detects the pointed position on the operation face, the number of which is one or more, as the first operating position.

Preferably, the second operation is successively conducted at the first position, the number of which is one or more, for a predetermined period of time or more.

Preferably, the second operation is conducted when pointing for the first position, the number of which is one or more, is stopped.

Preferably, the second operation is conducted by pointing the first position after the completion of the first operation.

Preferably, the second operation is conducted once or more at either of the first positions, the operation detector further detects the number of times of the second operation, and the function execution controller executes the function according to the first operating position at which the second operation is conducted and also according to the detected frequency of the second operation.

Preferably, the second operation is conducted once or more at either of the first positions, the operation detector further detects the number of times of the second operation, and the function execution controller executes the function after a state of the function corresponding to the first operating position, at which the second operation is conducted, is changed according to the number of times of the second operation.

Preferably, the third operation, which is conducted on the respective first operating position, the number of which is one or more, being combined with the second operation, is further conducted on the operation face, the operation detector further detects the third operation, and the function execution controller starts or finishes the function being combined with the third operation according to the detected third operation.

Preferably, the first operation of pointing at least one position on the operation face is operation in which a plurality of fingers simultaneously touch a plurality of positions on the operation face, and the operating position detector detects the region and its periphery, which the plurality of fingers touch, or the operating position detector detects either the region or its periphery, with which the plurality of fingers touch, as the first operating position.

Preferably, the operating position detector further makes the first operating position correspond to one or more of the thumb, forefinger, middle finger, third finger and little finger according to the positional relation of the first operating position.

Preferably, the function control unit further comprises a first voice guidance section for conducting voice guidance by utilizing the name of the finger which is made to correspond to the first operating position.

Preferably, the function control unit further comprises a second voice guidance section for conducting voice guidance of operation for the operation face.

Preferably, the function control unit further comprises a voice output section for outputting a predetermined voice according to operation for the operation face.

Preferably, a function control unit of the present invention comprises: a function control unit described in aspect 1; another function control unit for controlling the execution of the function by receiving operation; and a selector for selectively starting either of the function control unit or another function control unit according to operation.

[Image Forming Apparatus]

An image forming apparatus of the present invention comprises a function control unit described in either of the above items.

[Information Processor]

An information processor of the present invention comprises a function control unit described in either of the above items.

[Method of Controlling the Function]

A function control method of the present invention comprises the steps of: detecting a first operating position, the number of which is one or more, at which a first operation, the number of which is one or more, is conducted on an operation face receiving operation from the outside; making the first operating position detected, the number of which is one or more, correspond to a predetermined function, the number of which is one or more; detecting the second operation for the first operating position, the number of which is one or more; and controlling the execution of the function which is made to correspond to the first operating position, the number of which is one or more, at which the second operation is conducted.

[Program]

A program of the present invention is to make a computer execute the steps of: detecting a first operating position, the number of which is one or more, at which a first operation, the number of which is one or more, is conducted on an operation face receiving operation from the outside; making the first operating position detected, the number of which is one or more, correspond to a predetermined function, the number of which is one or more; detecting the second operation for the first operating position, the number of which is one or more; and controlling the execution of the function which is made to correspond to the first operating position, the number of which is one or more, at which the second operation is conducted.

DETAILED DESCRIPTION OF THE PREFERRED EMBODIMENTS

Figure 1:
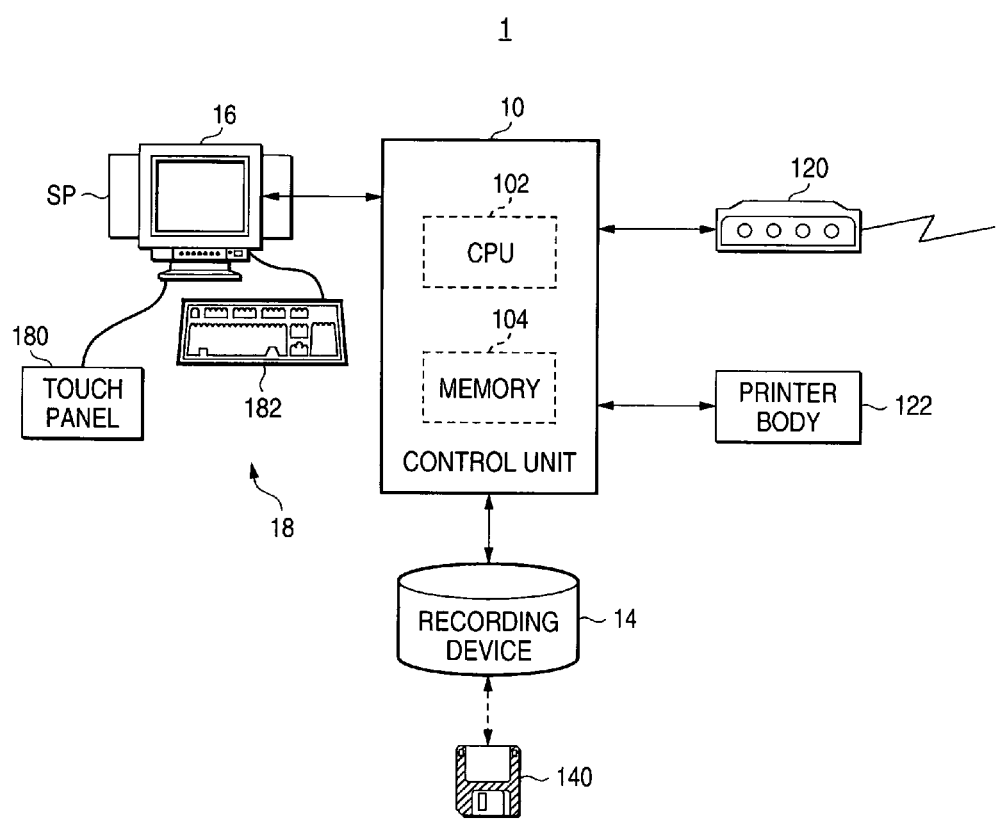
FIG. 1 is an arrangement view of the constitution of hardware of the printer system of the present invention, centering around the control unit.

First, the summary of the present invention will be explained below.

A function control method of the present invention is applied, for example, to a combined copier in which the number of copies is set with a touch panel.

In this function control method of the present invention, a portion on the touch panel with which a user's finger comes into contact is used as a button to select a function.

Explanations will be more specifically made as follows.

When a user places his finger on the touch panel, in an apparatus to which the function control method of the present invention is applied, a relation between the number of fingers placed on the touch panel and the positions where the fingers are placed is detected.

For example, in the case where two fingers (the forefinger and the third finger) are placed on the touch panel, the positions where the two fingers are placed are recognized, and which finger is placed on the right and which finger is placed on the left are recognized.

In the apparatus to which the function control method of the present invention is applied, in the case where five fingers are placed on the touch panel, positions where the five fingers are respectively placed are recognized. Further, where the first finger (the thumb or the little finger) is placed at either of the five positions, where the second finger (the forefinger or the third finger) is placed, where the third finger (the middle finger) is placed, where the fourth finger (the third finger or the forefinger) is placed and where the fifth finger (the little finger or the thumb) is placed are recognized.

As described above, on the touch panel, positions where the fingers are placed are detected, and which finger is placed at which position is also detected. Due to the foregoing, in the apparatus to which the function control method of the present invention is applied, positions on the touch panel where the fingers are respectively placed are made to correspond to the functions which are objects to be controlled. Therefore, the positions on the touch panel where the fingers are respectively placed are used as if they were buttons, and operation can be conducted by pressing each position. The present invention can provide the above operational environment.

According to the function control method of the present invention, the conventional idea that a button placed at a fixed position is made to correspond to a function and a user is made to memorize the position of the button is entirely changed over to a new idea that a position where the user has placed the finger is made to correspond to a function and this position is used as a button, that is, the position where the user has placed the finger is automatically made to correspond to the function, and operation is conducted through this position.

Further, for example, in the case where the five fingers of the right hand are placed on the touch panel, as described above, it is possible to recognize that the thumb is placed at the right position and the middle finger is placed at the center.

When each finger placed on the touch panel is combined with a voice guidance, the operation property can be more enhanced.

When the voice guidance guides in such a manner that "Select either of the functions of copying, sending in facsimile and scanning with the thumb." or "Designate the number of copies with the middle finger.", the operation property of the apparatus can be more enhanced.

First Embodiment

The first embodiment of the present invention will be explained as follows.

FIG. 1 is an arrangement view of the constitution of hardware of the printer system 1 of the present invention, centering around the control unit 10. As shown in FIG. 1, the printer system 1 includes: a control unit 10 having CPU 102 and the memory 104; a communication unit 120; a printer body 122; a recording unit 14; a display unit 16; and an input unit 18 such as a touch panel 180 and keyboard 182.

The communication unit 120 communicates with other nodes such as a computer and so on via a network not shown in the drawing.

The printer unit 122 includes components such as a print engine and scanner not shown which are necessary for a combined copier.

The functions of normal printing, two side printing and N-up printing can be designated by a user so that the printer body 122 can execute the designated function. The density of printing, the number of copies, the magnification and the facsimile number can be set on the printer unit body 122 by the user.

In the recording unit 14, data can be recorded in and played back from the recording medium 140 such as HD, FD or CD.

The display unit 16 includes: a display such as CRT or LCD; and a speaker (SP).

The input unit 18 is composed of input devices such as a touch panel 180 and keyboard 182.

The printer system 1 may be included in a network printer to print image data transmitted via the network, and also included in a combined copier containing the functions of a copier, facsimile device and scanner.

Figure 2:
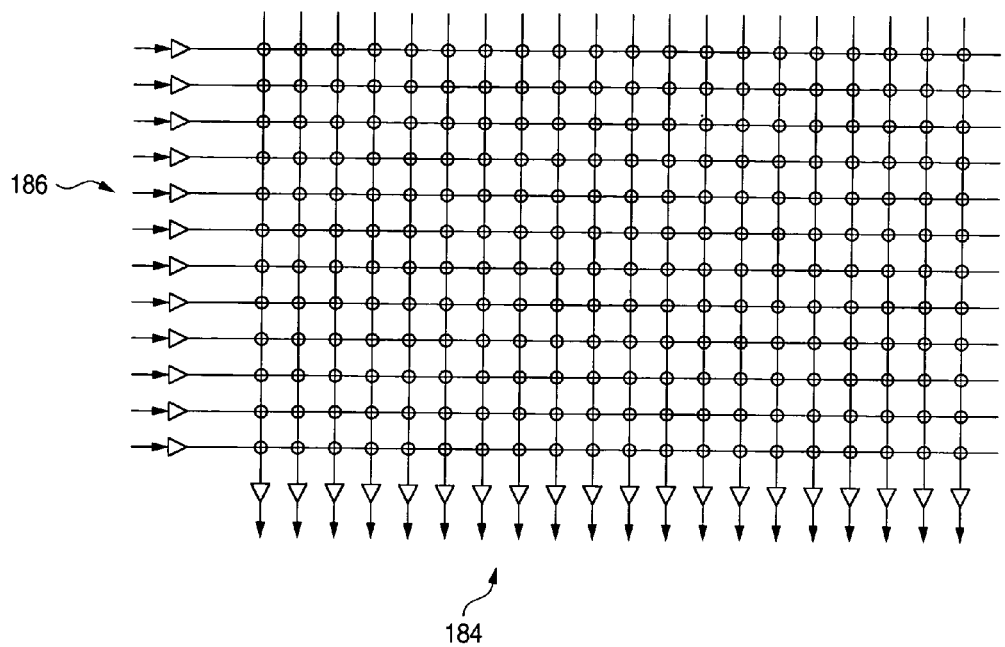
FIG. 2 is a view showing an arrangement of the touch panel shown in FIG. 1.

FIG. 2 is a view showing an arrangement of the touch panel 180 shown in FIG. 1.

Figure 3:
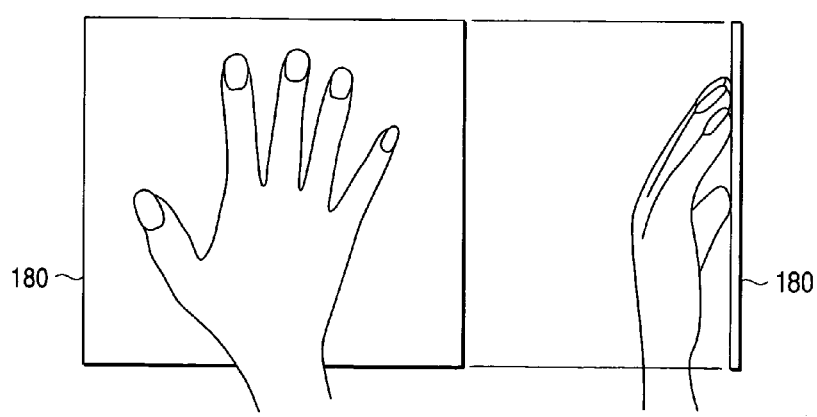
FIG. 3 is a view showing a state in which a user touches an operation face of the touch panel shown in FIGS. 1 and 2 with the fingers.

FIG. 3 is a view showing a state in which a user touches an operation face of the touch panel 180 shown in FIGS. 1 and 2 with the fingers.

Operation is received by the operation face of the touch panel 180.

As shown in FIG. 2, on the operation face of the touch panel 180, there are provided a plurality of electrodes 186 extending in the longitudinal direction and a plurality of electrodes 184 extending in the lateral direction.

As shown in FIG. 3, when the operation face is pressed down by a user's finger or pointed out by a stylus or others, the electrodes 184, 186 are contacted with each other at a lattice point, which is indicated by a circle in FIG. 2, in a portion pressed down or pointed out.

In this connection, pointer a contact with the finger. Alternatively, pointer a contact with the stylus.

Voltage is successively impressed upon the electrodes 184 extending in the lateral direction on the touch panel 180 shown in FIG. 2, and output voltage of the electrode 186 extending in the longitudinal direction is operated synchronously with the impression of the voltage upon the electrode 184 extending in the lateral direction. Due to the foregoing, it is possible to judge at which lattice point the electrodes 184, 186 are contacted with each other.

In the above function control method of the present invention, it is possible for a user to conduct operation on the touch panel 180 with either the fingers or the stylus. However, in order to simplify and specify the explanations, an example is taken up in which the user conducts operation on the operation face of the touch panel 180 with the fingers.

[UI Program 20]

Figure 4:
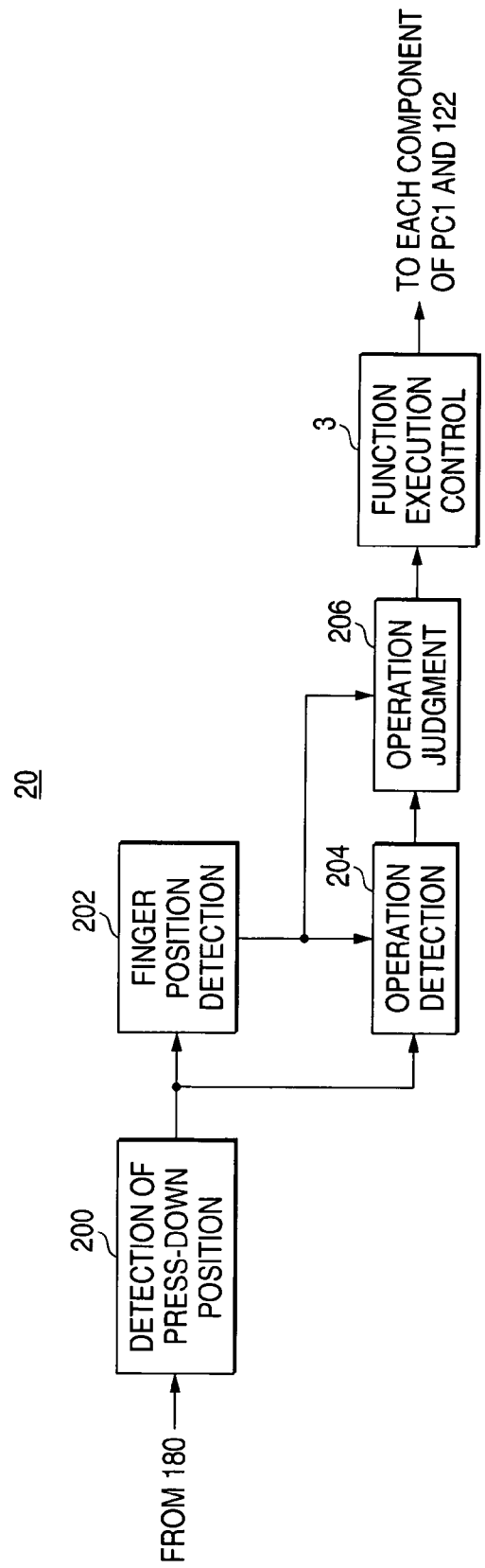
FIG. 4 is a view showing a constitution of the first UI program for visually handicapped persons in which the function control method of the present invention is realized.

FIG. 4 is a view showing a constitution of the first UI program 20 for visually handicapped persons in which the function control method of the present invention is realized.

As shown in FIG. 4, UI program 20 includes: a press-down position detecting section 200 (operating position detector); a finger position detector 202; an operation detecting section 204 (operation detector); and an operation judging section 206 (function correspondence making section).

UI program 20 is supplied to the control unit 10 via the recording medium 140 and loaded in the memory 104 and then executed.

By these components, UI program 20 detects a position of the finger, the number of which is one or more, which has been placed on the touch panel 180 (shown in FIGS. 1 and 2) by a user and makes the position correspond to a function, that is, UI program 20 makes the position be a "button" to receive a selection of the function. UI program 20 receives operation conducted on the button and notifies it to the function execution control section 3, so that UI program 20 makes the function execution control section 3 control to execute the function of the printer body 122. Alternatively, UI program 20 makes the function execution control section 3 conduct setting for the printer body 122.

[Press-down Position Detecting Section 200]

The press-down position detecting section 200 detects which portion on the operation face of the touch panel 180 (shown in FIGS. 1 and 2) is pressed down.

To be specific, when a voltage signal is successively impressed upon the electrode 184 extending in the lateral direction and an output signal is read out from the electrode 186 extending in the longitudinal direction, the press-down position detecting section 200 detects a lattice point (shown in FIG. 2) on the touch panel 180 at which the electrodes 184 and 186 are touched to each other.

The press-down position detecting section 200 outputs the detected press-down position into the finger position detecting section 202 and UI program 204.

[Finger Position Detecting Section 202]

Figure 5:
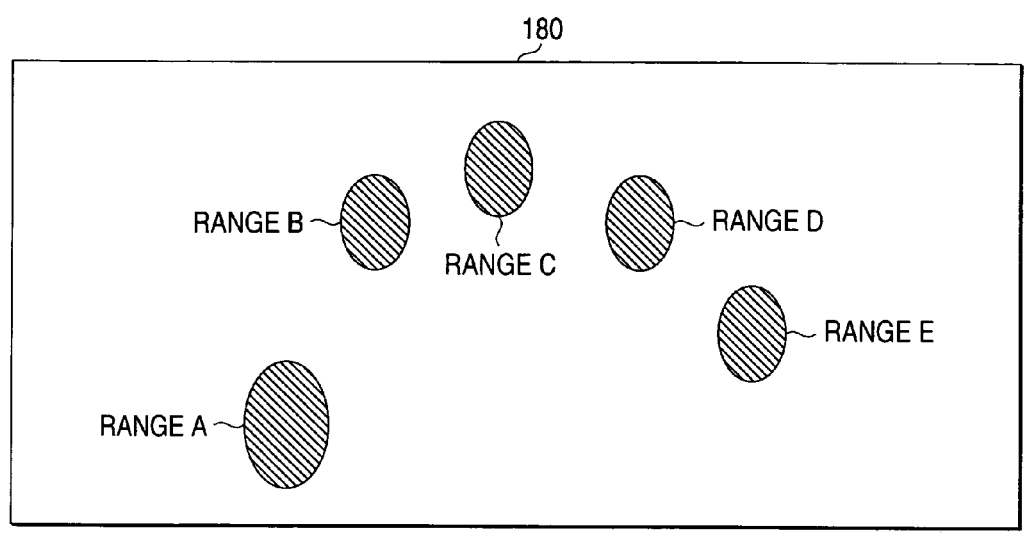
FIG. 5 is a view exemplarily showing regions in which the press-down is detected by the press-down position detecting section shown in FIG. 4 and the positions of the fingers are detected by the finger position detecting section in the case where the operation face of the touch panel is pressed down by the five fingers of the right hand as shown in FIG. 3.

FIG. 5 is a view exemplarily showing regions in which the press-down is detected by the press-down position detecting section 200 shown in FIG. 4 and the positions of the fingers are detected by the finger position detecting section 202 in the case where the operation face of the touch panel 180 is pressed down by the five fingers of the right hand as shown in FIG. 3.

The finger position detecting section 202 detects the positions of the user's fingers according to the press-down positions inputted from the press-down position detecting section 200, and buttons used for selecting the function are arranged at the positions on the operation face of the touch panel 180 where the fingers are detected.

In order for the user to decide the button positions, the five fingers (the thumb, forefinger, middle finger, third finger and little finger) of the right hand are placed on the operation face of the touch panel 180 as shown in FIG. 3. When the press-down position detecting section 200 detects positions which are pressed down by the five fingers, the finger position detecting section 202 appropriately conducts clustering on the detected lattice points at which the press-down have been detected, and ranges A to E of the lattice points obtained by clustering are detected as the positions where the fingers are placed.

When necessary, according to the positional relations among the detected ranges A to E of the user's fingers as exemplarily shown in FIG. 5 and also according to which hand of the user is placed on the operation face of the touch panel 180, the finger position detecting section 202 judges to which finger (the thumb, forefinger, middle finger, third finger and little finger) of the user each of the ranges A to E corresponds.

Accordingly, as exemplarily shown in FIG. 3, when the user places the fingers of the right hand on the operation face of the touch panel 180, ranges A to E shown in FIG. 5 are respectively made to correspond to the thumb, forefinger, middle finger, third finger and little finger.

When the user places the fingers of the left hand on the operation face of the touch panel 180, ranges A to E shown in FIG. 5 are respectively made to correspond to the little finger, third finger, middle finger, forefinger and thumb by the finger position detector 202.

In this connection, in the case where it is necessary to make the detected range correspond to the finger and the number of buttons is not more than four, the finger position detector 202 makes the detected range correspond to the finger according to the number of the necessary buttons as follows.

When the user places one finger, which corresponds to the number of the necessary buttons, on the operation face of the touch panel 180 according to the voice guidance (described later referring to FIGS. 7 and 8) and the manual, one range (not shown) is detected by the finger position detecting section 202.

In the same manner, when the user places two fingers on the operation face of the touch panel 180, two ranges (not shown) are detected by the finger position detector 202. When necessary, these two ranges are respectively made to correspond to the finger on the right and the finger on the left by the finger position detector 202.

In the same manner, when the user places three fingers on the operation face of the touch panel 180, three ranges (not shown) are detected by the finger position detector 202. When necessary, these three ranges are respectively made to correspond to the finger on the right, the finger in the middle and the finger on the left by the finger position detector 202.

In the same manner, when the user places four fingers on the operation face of the touch panel 180, four ranges (not shown) are detected by the finger position detector 202. When necessary, these four ranges are respectively made to correspond to the first to the fourth finger from the right.

The results of processing of the finger position detecting section 202 explained above are outputted to the operation judging section 206.

[Operation Detector 204]

After the buttons have been provided on the operation face of the touch panel 180 by the finger position detector 202, the operation detector 204 detects operation for the buttons provided as described above and outputs it to the operation detecting section 204.

It can be considered that the following operation is conducted on the buttons.

In the state in which the fingers of the user touch all buttons provided on the touch panel 180, only the finger touching the button corresponding to the function to be selected is separated from the button (Operation 1; the second operation).

In the state in which the fingers of the user are separated from all buttons provided on the touch panel 180, the user touches only the buttons corresponding to the function to be selected with the fingers (Operation 2; the second operation).

In the case of setting the number of copies, the finger separating from the setting button is touched to the setting button and separated from it by the number of times corresponding to the number of copies (Count-up operation; the second operation).

In the case of setting sheets of copying paper, the finger separating from the setting button is touched to the setting button and separated from it by the number of times corresponding to the number of the predetermined setting (Toggle operation; the second operation).

In the case where operation is started for all buttons which have been set, in the case where all setting has been completed and in the case where operation of UI program is finished, the user touches the buttons with the fingers by a specific method which is respectively determined for each case (Specific operation; the third operation).

[Operation Judging Section 206]

The operation judging section 206 makes the respective buttons and fingers, which have been set as described above, correspond to the functions to be executed by the control unit 10 and the printer body 122.

When the operation detecting section 204 detects operation, the operation judging section 206 judges which function the detected operation selects, and the result of the judgment is outputted to the function execution controlling section 3.

[Function Execution Controlling Section 3]

The function execution controlling section 3 controls each component of the control unit 10 or the printer body 122 according to the result of the judgment of the operation judging section 206 and makes the function execute.

When the function execution controlling section 3 controls the execution of the start of copying, selection of copying sheets, clearance of the setting, stop of printing and setting of other information, the specific example of controlling the execution will be explained below.

[Operation of UI Program 20]

Operation of UI program 20 (shown in FIG. 4) will be explained as follows.

Figure 6:
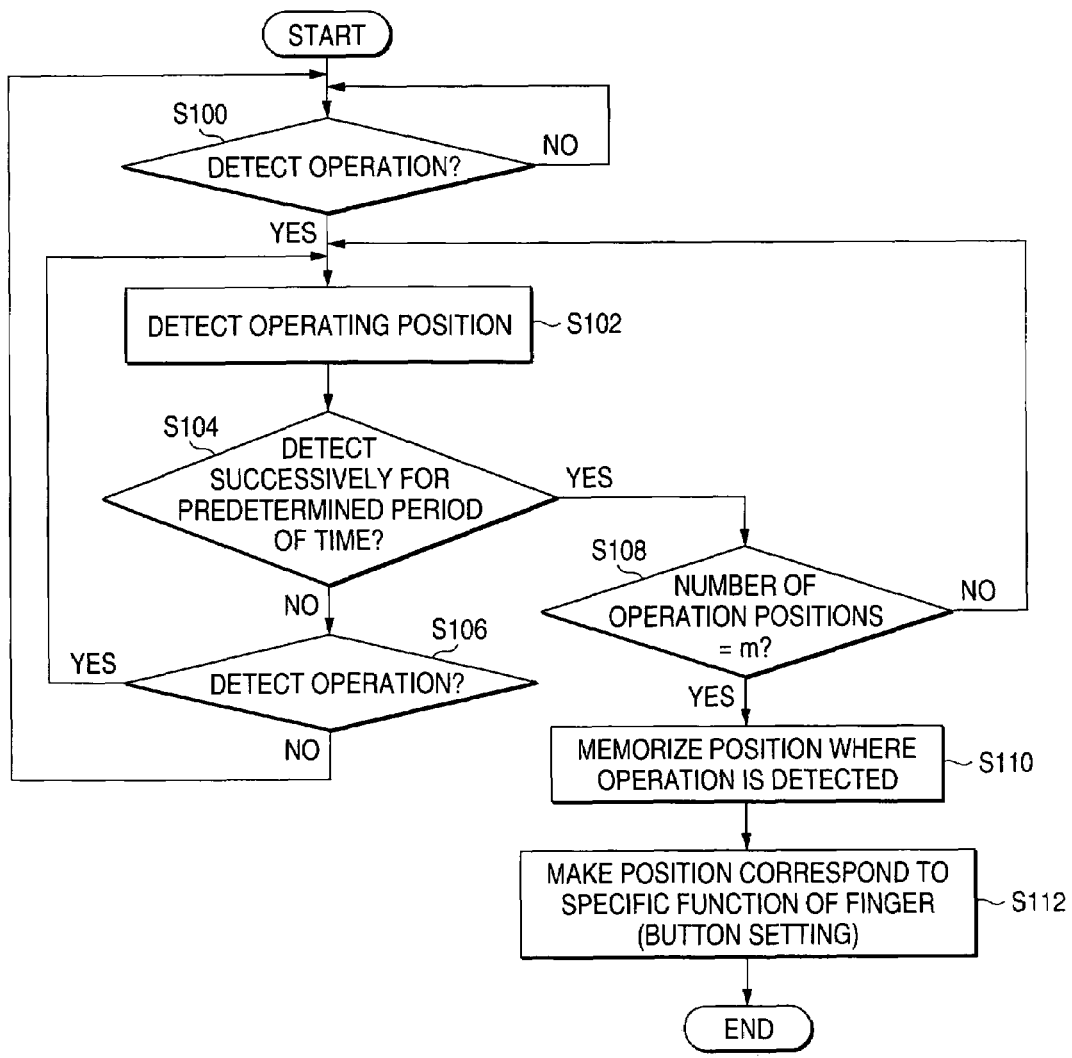
FIG. 6 is a flow chart showing the processing of setting buttons (S10) in the printer system.

FIG. 6 is a flow chart showing the processing of setting buttons (S10) in the printer system 1.

As shown in FIG. 6, in step 100 (S100), the press-down position detecting section 200 of UI program 20 judges whether or not operation (the first operation) for the touch panel 180 (shown in FIGS. 1 and 2) has been conducted.

When the operation has been conducted, the press-down position detecting section 200 detects the press-down position and proceeds to the processing of S102. In the cases except for that, the press-down position detecting section 200 stays in S100.

In step 102 (S102), the press-down position detecting section 200 and the finger position detecting section 202 cooperate with each other and detect the user's finger position (operating position) on the operation face of the touch panel 180.

In step 104 (S104), the finger position detecting section 202 judges whether or not the operating position is successively detected at a predetermined position for a predetermined period of time (for example, 5 seconds).

In the case where the operating position is successively detected for a predetermined period of time, UI program 20 proceeds to the processing in S108. In the cases except for that, UI program 20 proceeds to the processing of S108.

In step 106 (S106), the press-down position detecting section 200 and the finger position detecting section 202 judge whether or not the user conducts operation on the operation face of the touch panel 180.

In the case where the user does not conduct operation on the operation face of the touch panel 180, UI program 20 proceeds to S102. In the cases except for that, UI program 20 returns to the processing of S100.

In step 108 (S108), the finger position detecting section 202 judges whether or not the necessary number (m) of operating positions are detected in the processing of S102.

In the case where the necessary number (m) of operating positions are detected, UI program 20 proceeds to the processing of S110. In the cases except for that, UI program 20 proceeds to S102.

In step 110 (S110), the finger position detecting section 202 conducts clustering on the operating positions detected and stores them, and the buttons are set on them.

When necessary, for example, the finger position detecting section 202 makes the respective detected operating positions correspond to the thumb to the little finger. In this case, according to the positional relation of the detected regions and/or the dimensions and profiles of the regions, it is possible to distinguish between the right and the left hand and also it is possible to distinguish between the fingers.

In step 112 (S112), the operation judging section 206 makes the respective buttons, which have been set in the processing of S110, and the respective types of fingers correspond to the functions to be executed in the control unit 10 and the printer body 122.

By the processing of S10 explained above, the buttons used for selecting the functions are set at positions with which the user's fingers come into contact on the operation face of the touch panel 180.

Figure 7:
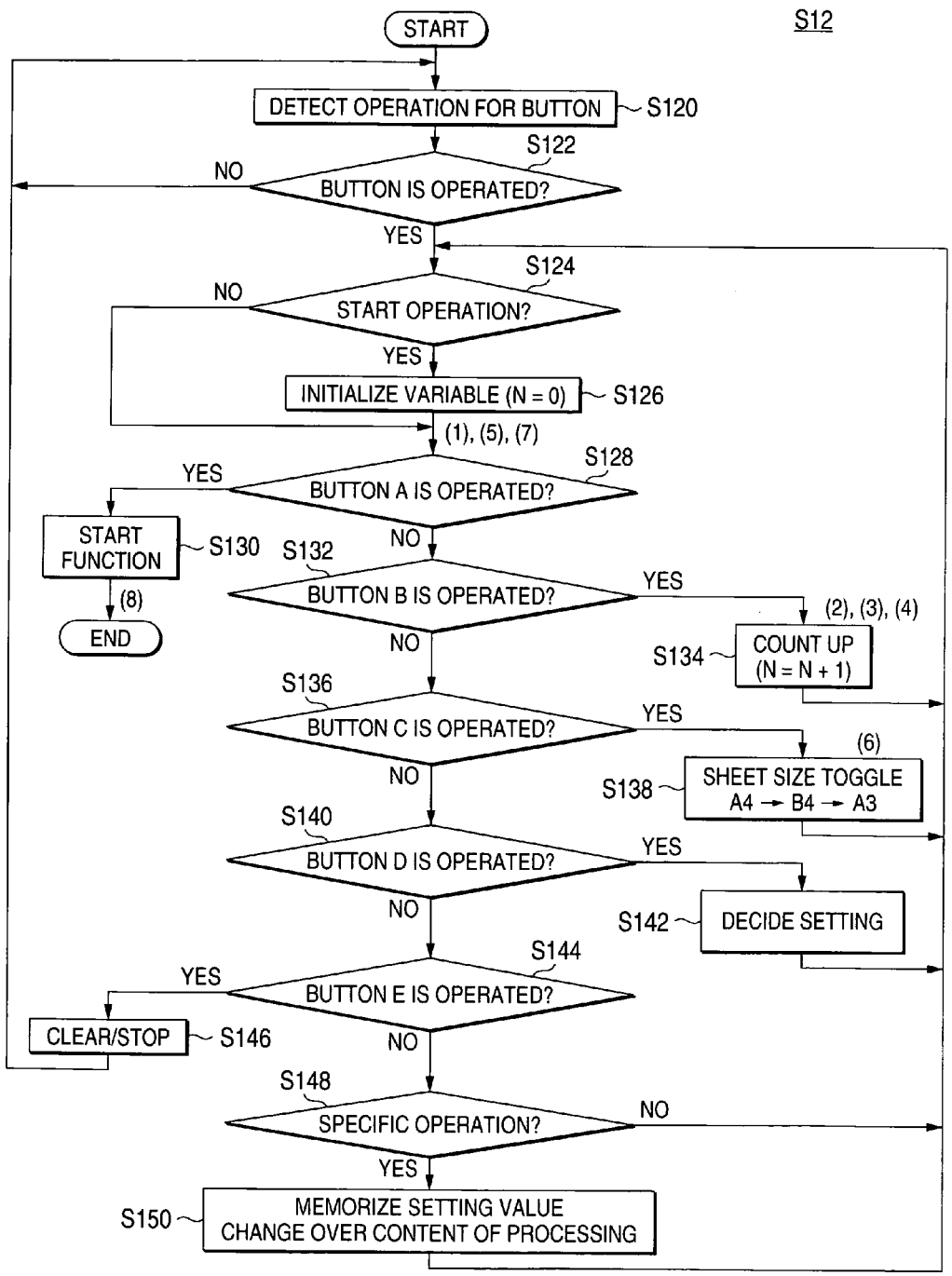
FIG. 7 is a flow chart showing the function control processing (S12) in the printer system.

FIG. 7 is a flow chart showing the function control processing (S12) in the printer system 1.

Figure 13:
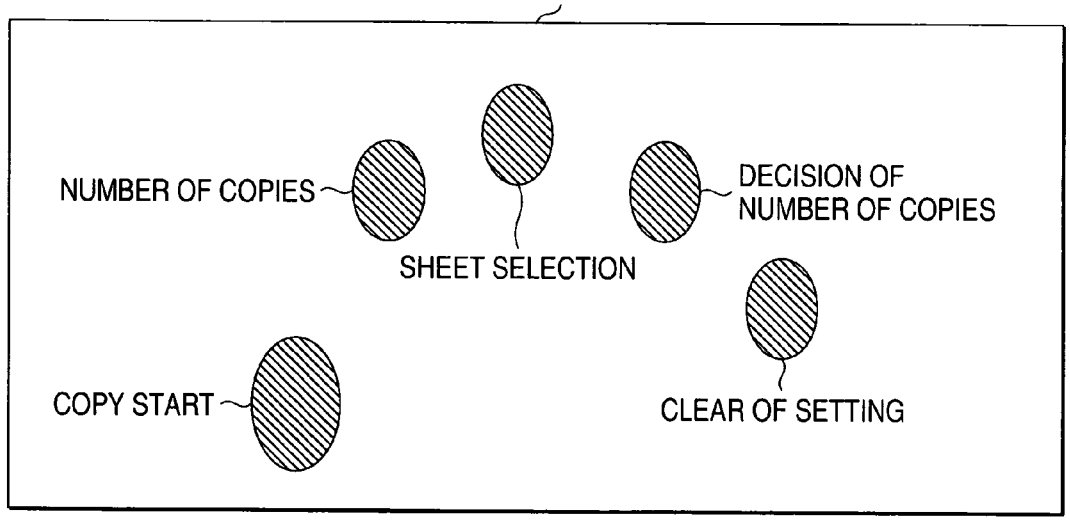
FIG. 13 is a view showing an example of the functions allotted to the detected positions of the fingers in the case where the present invention is applied to a printer system and the five fingers of the user's right hand press down the operation face of the touch panel.

In the explanations made referring to FIG. 7, the following cases are made to be a specific example. Buttons A to E are set for ranges A to E exemplarily shown in FIG. 5 by the finger position detector 202; button A is made to correspond to the function of starting copying by the operation judging section 206; button B is made to correspond to the function of setting the number of copies; button C is made to correspond to the function of selecting sheets of paper; button D is made to correspond to the decision of information; and button E is made to correspond to the function of clearing information which has been set until that time and also made to correspond to the function of stopping copying operation. This specific example is shown in FIG. 13.

As shown in FIG. 7, in step 120 (S120), the press-down position detecting section 200 and the operation detecting section 204 cooperate with each other and detects operation for the buttons.

In step 122 (S122), the press-down position detecting section 200 and the operation detecting section 204 cooperate with each other and judges whether or not operation is conducted on the buttons which have been set by the processing of S10.

In the case where operation is conducted on the buttons, UI program 20 proceeds to S124. In the cases except for that, UI program 20 returns to S120.

In step 124 (S124), the operation detecting section 204 judges whether or not the detected operation is operation (one type of the above specific operation) to start operation for the buttons which have been set on the operation face of the touch panel 180 by the processing of S10.

In the case where the detected operation is operation to start searching, UI program 20 proceeds to the processing of S126. In the cases except for that, UI program 20 proceeds to S128.

In step 126 (S126), the operation judging section 206 initially sets a variable used for controlling the execution of the function.

For example, the operation judging section 206 conducts initialization of variable N, which represents the number of copies, so that it can be set at the initial value of 1.

In step 128 (S128), the operation detecting section 204 judges whether or not operation (for example, the above operation examples 1 and 2) for button A is conducted.

In the case where the above operation for button A is conducted, in step 130 (S130), the operation judging section 206 notifies the function execution controlling section 3 of the fact that the function start is selected.

The function execution controlling section 3, which has received the notification, controls each component of the printer body 122 and the control unit 10 according to the notification sent from the operation judging section 206, so that the copying function is started.

In step 132 (S132), the operation detecting section 204 judges whether or not operation (for example, the above count-up operation) for button B is conducted.

In the case where operation for button B is conducted, in step 134 (S134), the operation judging section 206 notifies the function execution control section 3 of the fact that the count-up of the number of copies is selected.

The function execution control section 3, which has received the fact that the count-up of the number of copies is selected, controls each component of the printer body 122 and the control unit 10 according to the notification sent from the operation judging section 206, so that the number of copies is counted up (N=N+1).

In step 136 (S136), the operation detecting section 204 judges whether or not operation (for example, the above toggle operation) is conducted on button C.

In the case where operation is conducted on button C, in step 138 (S138), the operation judging section 206 notifies the function execution control section 3 of the fact that the sheet size change is selected.

The function execution control section 3, which has received the notification, controls each component of the printer body 122 and the control unit 10 according to the notification sent from the operation judging section 206, so that the sheet size is changed.

In step 140 (S140), the operation detecting section 204 judges whether or not operation (for example, the above toggle operation) is conducted on button D.

In the case where operation is conducted on button D, in step 142 (S142), the operation judging section 206 decides the number of copies and the sheet size selected in the processing of S134 and S138.

In step 144 (S144), the operation detecting section 204 judges whether or not operation (for example, the above operation examples 1 and 2) is conducted on button E.

In the case where operation is conducted on button E, in step 146 (S146), the operation judging section 206 notifies the function execution control section 3 of the fact that the clearance of the setting or the stoppage of the function such as copying, which is being executed now, is selected.

The function execution control section 3, which has received the notification, clears the setting according to the notification sent from the operation judging section 206 or stops the function which is being executed at the present time.

In step 148 (S148), the operation detecting section 204 judges whether or not operation (one type of the above specific operation) is simultaneously conducted on buttons A to E.

In the case where operation is simultaneously conducted on buttons A to E, in step 150 (S150), the function execution control section 3 stores the setting value which have been set, and UI program 20 conducts processing for conducting the other setting (for example, the setting of the facsimile number).

Second Embodiment

The second embodiment of the present invention will be explained as follows.

Figure 8:
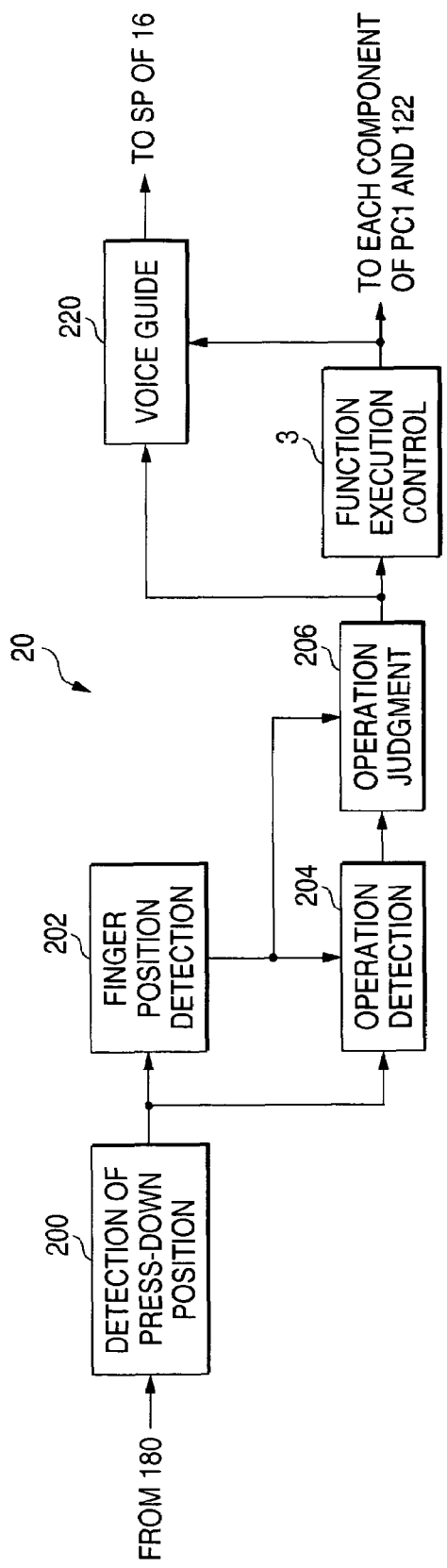
FIG. 8 is a view showing a constitution of the second UI program for visually handicapped persons in which the function control method of the present invention is realized in the control unit shown in FIG. 1.

FIG. 8 is a view showing a constitution of the second UI program 22 for visually handicapped persons in which the function control method of the present invention is realized in the control unit 10 shown in FIG. 1.

In this connection, like reference characters are used to indicate like parts in FIG. 4 showing the first UI program 20 and FIG. 8 showing the second UI program 22.

As shown in FIG. 8, the second UI program 22 is composed in such a manner that the voice guide section 220 (the voice guidance section) is added to the first UI program 20 and the function execution control section 3.

By the above components, the second UI program 22 provides the same user interface as that of the first UI program 20 and guides the operation to be conducted with a voice. Therefore, the operation property for visually handicapped persons can be more enhanced.

The voice guide section 220 generates a voice for teaching operation to the user and outputs the voice from the speaker (shown in FIG. 1) according to the operation judged by the operation judging section 206 and also according to the content of control for controlling each component of the printer system 1 by the function execution control section 3.

The contents of the operation guide outputted by a voice from the voice guide section 220 are described as follows.

In this connection, numbers (1) to (8) of the operation guide correspond to numbers (1) to (8) of the operation time shown in FIG. 7.

"Part 1. If it is all right with you, please decide with the third finger. ; Operation guide (2)"

"Part 2. If it is all right with you, please decide with the third finger. ; Operation guide (3)"

"Part 3. If it is all right with you, please decide with the third finger. ; Operation guide (4)"

"Please change over the sheets of paper with the middle finger. Size A4 is used at present. If it is all right with you, please decide with the third finger. ; Operation guide (5)"

"Size B4 (A3) is used at present. If it is all right with you, please decide with the third finger. ; Operation guide (6)"

"It is possible to clear the setting with the little finger. It is possible to start copying with the thumb. ; Operation guide (7)"

"Copying has finished. ; Operation guide (8)"

Referring to FIG. 7 again, operation of UI program 22 will be explained as follows.

In this connection, except for the explanations of the operation guides (1) to (8) made by the voice guide section 220, the processing of the second UI program 22 shown in FIG. 7 is the same as the processing corresponding to the first UI program 20 explained in the first embodiment.

As shown in FIG. 7, after the processing has been completed in S126, the voice guide section 220 outputs voices of the operation guide sections (1), (5), (7) described above.

When operation conducted on button B is detected by the processing in step 132 (S132), the voice guide section 220 outputs a voice of either the above operation guide (2), (3) or (4) according to the designated number of copies.

When operation conducted on button C is detected by the processing in step 136 (S136), the voice guide section 220 outputs a voice of the above operation guide (6) according to the designated sheet size.

When the execution of the function started in step 130 (S130) is completed, the voice guide section 220 outputs the voice described in the above item (8).

Third Embodiment

The third embodiment of the present invention will be explained as follows.

Figure 9:
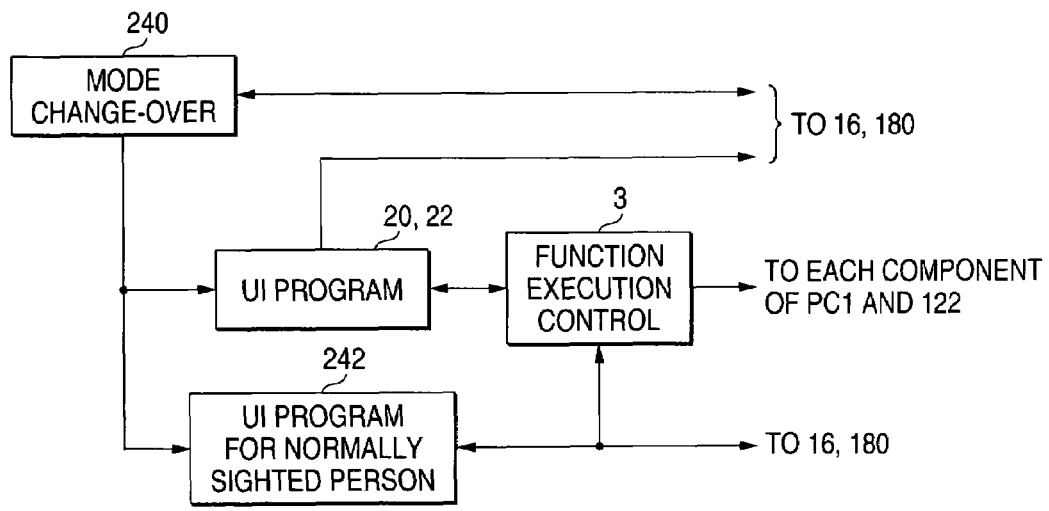
FIG. 9 is a view showing a constitution of the third UI program used for both visually handicapped persons and normally eye-sighted persons by which the function control method of the present invention can be realized in the control unit shown in FIG. 1.

FIG. 9 is a view showing a constitution of the third UI program 24 used for both visually handicapped persons and normally eye-sighted persons by which the function control method of the present invention can be realized in the control unit 10 shown in FIG. 1.

As shown in FIG. 9, UI program 24 includes: UI program 20, 22 (shown in FIGS. 4 and 8); a mode changeover section 240 (selector); and UI program 242 (another function control unit) used for normally eye-sighted persons.

UI program 24 can change over between the first 20 and the second UI program 22 for visually handicapped persons and UI program 242 for normally eye-sighted persons. Therefore, it is possible to provide a user interface capable of being effectively operated by both visually handicapped persons and normally eye-sighted persons.

Figure 10:
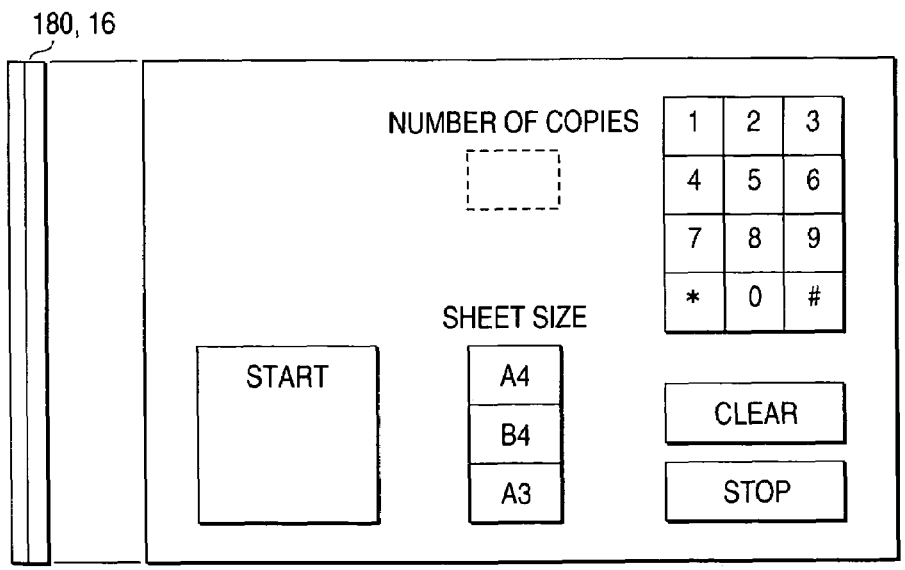
FIG. 10 is a view exemplarily showing UI image displayed on the display unit and the touch panel by UI program for normally eye-sighted persons shown in FIG. 9.

FIG. 10 is a view exemplarily showing UI image displayed on the display unit 16 and the touch panel 180 by UI program 242 for normally eye-sighted persons shown in FIG. 9.

UI program 242 for normally eye-sighted persons displays an image (UI image) for operation, which is exemplarily shown in FIG. 10, on the display unit 16 or the touch panel 180 shown in FIG. 1. Then, UI program 242 for normally eye-sighted persons makes the function execution control section 3 execute the function according to the operation displayed on the displayed image.

In other words, UI program 242 provides a common UI environment used by normally eye-sighted persons.

The mode change-over section 240 starts either UI programs 20, 22 or UI program 242 according to the selecting operation inputted from the touch panel 180 and the keyboard 182 shown in FIG. 1.

Operation of UI program 24 will be explained as follows.

Figure 11:
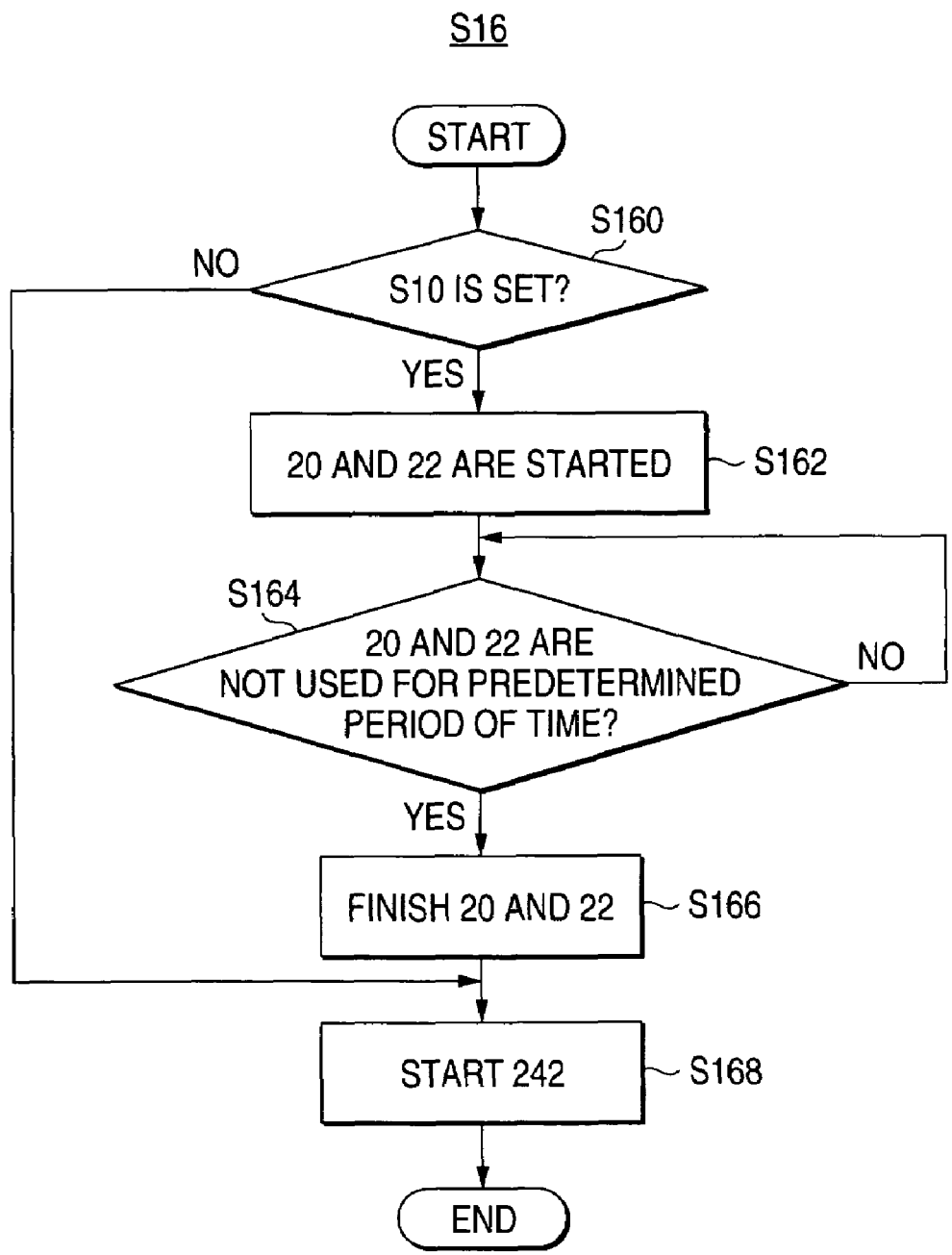
FIG. 11 is a flow chart showing the processing (S16) of UI program shown in FIG. 9.

FIG. 11 is a flow chart showing the processing (S16) of UI program 24 shown in FIG. 9.

As shown in FIG. 11, in step 160 (S160), the mode changeover section 240 judges whether or not the button setting processing (S10) shown in FIG. 6 is conducted.

In the case where the button setting processing is conducted, UI program 24 proceeds to S162. In the cases except for that, UI program 24 proceeds to S168.

In step 162 (S162), the mode change-over section 240 starts UI programs 20, 22.

In step 164 (S164), the mode change-over section 240 judges whether or not UI programs 20, 22 are used for a predetermined period of time. In the case where UI programs 20, 22 are used for a predetermined period of time, UI programs 20, 22 stay in S164. In the cases except for that, UI programs 20, 22 proceed to S166.

In step 166 (S166), the mode change-over section 240 finishes UI programs 20.

In step 168 (S168), the mode change-over section 240 starts UI program 242.

[Variation]

Even in the case of conducting the voice guidance, when a user has got used to operation, the voice guidance may be stopped.

In other words, in the case where the user has already memorized operation in which the finger type and its operation are made to correspond to each other, the voice guidance may be stopped according to the user's operation.

Alternatively, the voice guidance may be appropriately conducted according to the content of operation in such a manner that the voice guidance is conducted only on a difficult and complicated operation and no voice guidance is conducted on a simple operation.

The touch panel 180 is not limited to the contact type touch panel shown in FIG. 2 but it is possible to use an optically coupled type touch panel on which a position can be detected when an interruption of rays of light is detected and also it is possible to use a resistance type touch panel on which a position can be detected by electric potentials of electrodes arranged at both ends of a resistance film.

In the printer system 1 which is exemplarily shown, an object on which execution control is conducted by the function control method of the present invention is the printer body 122. However, it should be noted that the present invention is not limited to the above specific embodiment, that is, the function control method of the present invention can be applied to apparatus of other types such as a printing machine, printer body, copier body, scanner body, facsimile body, ticket vending machine, information guide unit and medical examination reception unit provided in a hospital.

The function control method of the present invention is appropriately used for a user interface provided in an information processor such a computer.

The function control method of the present invention can provide not only a user interface capable of being effectively operated by visually handicapped persons but also a user interface capable of being effectively operated even by normally eye-sighted persons in the circumstances in which it is difficult to visually recognize the contents on the display.

In this connection, on the touch panel 180, an image on the display unit 16 is displayed. Therefore, the touch panel 180 can be used as both the display unit and the input device.

It is possible to prepare a transparent or opaque touch panel 180 and bond the touch panel 180 onto a display face of the display unit 16.

Concerning the position of the finger detected by the finger position detector 202, a position, the press-down operation of which is detected by the press-down position detector 200, may be used as it is without conducting clustering operation. Alternatively, a range obtained by clustering may be used as it is. Alternatively, a range obtained by clustering may be used being expanded.

Setting of information changed by button D, which is explained in FIG. 7, may be the copy density and the magnification. Further, setting of information changed by button D may be the sorter setting, one-side/two-side setting, facsimile function and scanning function.

Button operation shown in FIG. 7 is only an example. For example, in S142 shown in FIG. 7, information to change the setting by the operation judging section 206 in the case of operation conducted on buttons B and C may be changed, for example, from the number of copies to the density of copying and also from the sheet size to the copying magnification.

In UI program 22, for example, according to the operation conducted by a user, the voice guide section 220 may be changed over between the above operation guides (1) to (8) and a single beep, so that the voice guide section 220 can output either the operation guides (1) to (8) or the single beep.

When the voice guide section 220 outputs not a voice but a simple beep, it is possible for the user to confirm that operation has been positively conducted on the button. Further, in the case where the user gets used to operation and does not want to get a voice guide, it is possible to stop an unnecessary voice guide, which is convenient.

According to the designation of the user, the voice guide section 220 may output neither a voice nor a beep.

Figure 12:
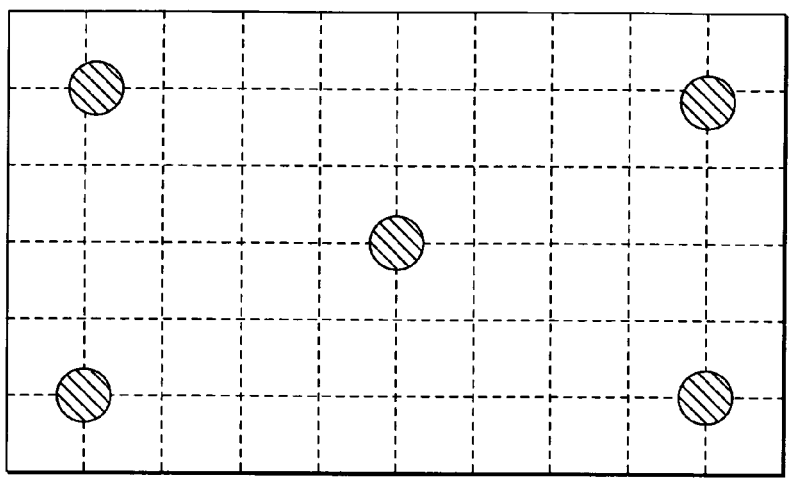
FIG. 12 is a view showing irregularities for operation provided on the touch panel.

FIG. 12 is a view showing irregularities for operation provided on the touch panel 180.

As exemplarily shown in FIG. 12, when lattice-shaped irregularities or circular irregularities are provided on the operation face of the touch panel 180, it becomes possible for the user to recognize positions where the user's fingers are placed by the sense of touch. Therefore, the operation property can be more enhanced.

According to the function control method of the present invention, only when the user places the hand on the touch panel, it is possible for the user to conduct five types of operation with one hand and 10 types of operation with both hands without using the sense of sight. Further when the operation procedure and the state transition of the apparatus according to the operation are devised, many types of operation can be conducted.

Concerning the touch panel used for the function control method of the present invention, it is unnecessary to change the specification for each type of the apparatus. Therefore, the touch panel used for the function control method of the present invention is suitable for mass production, and the manufacturing cost can be reduced.

According to the function control method of the present invention, the positions of the user's fingers are appropriately used as buttons for selecting the functions. Therefore, it is unnecessary for the user to memorize the positions of the buttons arranged at the fixed positions on the touch panel. Accordingly, the operation property can be enhanced.

According to the function control method of the present invention, it is possible for the user to conduct predetermined operation without accurately gaining access to the buttons arranged at specific positions. Accordingly, the operation property can be enhanced.

As explained above, according to the function control unit of the present invention and the method thereof, the user interface for visually handicapped persons can be easily applied to various types of units different from each other.

Further, the function control unit of the present invention and the method thereof can be simply operated by visually handicapped persons.

What is claimed is:

1. A function control unit comprising:
   an operating position detector for detecting a plurality of first operating positions at which a first operation is respectively conducted on an operation face on which operation is received from the outside and detecting a positional relation of the first operating positions, wherein
   the first operation includes operation for pointing a position on the operation face, and the operating position detector detects the pointed position on the operation face as one of the first operating positions,
   the first operation of pointing at least one position on the operation face is operation in which a plurality of fingers simultaneously touch a plurality of positions on the operation face, and
   the operating position detector detects a region and a periphery thereof, which the plurality of fingers touch, or the operating position detector detects either the region or the periphery thereof, which the plurality of fingers touch, as one of the first operating positions;
   a function correspondence making section for setting a predetermined function to the positional relation of the first operating positions detected by the operating position detector respectively, in response to each of one or more detection of the first operating positions;
   an operation detector for detecting a second operation corresponding to the positional relation of the first operating positions; and
   a function execution controller for controlling the execution of the function set to one of the first operating positions on which the second operation is conducted, wherein the operation face includes a touch panel including finger positions on the touch panel corresponding to controllable functions.

2. The function control unit according to claim 1, wherein the touch panel receives operation via the operation face.

3. The function control unit according to claim 2, wherein said touch panel includes a position display for respectively displaying a position on the operation face of said touch panel by the sense of touch.

4. The function control unit according to claim 1, wherein the second operation is successively conducted at the first position for a predetermined period of time or more.

5. The function control unit according to claim 1, wherein the second operation is conducted when pointing for the first position is stopped.

6. The function control unit according to claim 1, wherein the second operation is conducted by pointing the first position after the completion of the first operation.

7. The function control unit according to claim 1, wherein the second operation is conducted once or more at either of the first positions,
   the operation detector further detects a number of times of the second operation, and
   said function execution controller executes the function according to one of the first operating positions at which the second operation is conducted and also according to the detected number of times of the second operation.

8. The function control unit according to claim 1, wherein the second operation is conducted once or more at either of the first positions,
   said operation detector further detects a number of times of the second operation, and
   said function execution controller executes the function after a state of the function corresponding to one of the first operating positions, at which the second operation is conducted, is changed according to the number of times of the second operation.

9. The function control unit according to claim 1, wherein a third operation, which is conducted on one of the respective first operating positions, being combined with the second operation, is further conducted on the operation face,
   said operation detector further detects the third operation, and
   said function execution controller starts or finishes the function being combined with the third operation according to the detected third operation.

10. The function control unit according to claim 1, wherein said operating position detector further makes the first operating positions correspond to one or more of a thumb, forefinger, middle finger, third finger and little finger according to a positional relation of the first operating positions.

11. The function control unit according to claim 10, further comprising:
    a first voice guidance section for conducting voice guidance by utilizing a name of the finger which is made to correspond to one of the first operating positions.

12. The function control unit according to claim 1, further comprising:
    a second voice guidance section for conducting voice guidance of operation for the operation face according to the function which is made to correspond to the operating position.

13. The function control unit according to claim 1, further comprising:
    a voice output section for outputting a predetermined voice according to operation for the operation face.

14. A function control unit comprising:
    a function control unit described in claim 1;

another function control unit for controlling the execution of the function by receiving operation; and a selector for selectively starting either of the function control unit or the another function control unit according to operation.

15. An image forming apparatus comprising:
a function control unit described in claim 1.

16. An information processor comprising:
a function control unit described in claim 1.

17. A function control method comprising:
detecting a plurality of first operating positions at which a first operation is conducted on an operation face receiving operation from the outside and detecting a positional relation of the first operating positions, wherein the first operation includes operation for pointing a position on the operation face, and the operating position detector detects the pointed position on the operation face as one of the first operating positions, the first operation of pointing at least one position on the operation face is operation in which a plurality of fingers simultaneously touch a plurality of positions on the operation face, and the operating position detector detects a region and a periphery thereof, which the plurality of fingers touch, or the operating position detector detects either the region or the periphery thereof, which the plurality of fingers touch, as one of the first operating positions;

setting a predetermined function to the positional relation of the first operating positions detected in response to each of one or more detection of the first operating positions;

detecting a second operation corresponding to the positional relation of the first operating positions; and controlling an execution of the function set to one of the first operating positions at which the second operation is conducted, wherein the operation face is a touch panel including finger positions on the touch panel corresponding to controllable functions.

18. A recording medium for recording a program to make a computer execute:

detecting a plurality of first operating positions at which a first operation is conducted on an operation face receiving operation from the outside and detecting a positional relation of the first operating positions, wherein the first operation includes operation for pointing a position on the operation face, and the operating position detector detects the pointed position on the operation face as one of the first operating positions, the first operation of pointing at least one position on the operation face is operation in which a plurality of fingers simultaneously touch a plurality of positions on the operation face, and the operating position detector detects a region and a periphery thereof, which the plurality of fingers touch, or the operating position detector detects either the region or the periphery thereof, which the plurality of fingers touch, as one of the first operating positions;

setting a predetermined function to the positional relation of the first operating positions detected in response to each of one or more detection of the first operating positions;

detecting a second operation corresponding to the positional relation of the first operating positions; and controlling an execution of the function set to one of the first operating positions at which the second operation is conducted, wherein the operation face is a touch panel including finger positions on the touch panel corresponding to controllable functions.

19. A function control unit comprising:
an operating position detector configured to detect a plurality of first operating positions at which a plurality of first operations are conducted on an operation face on which operation is received from the outside;

a positional relation memory configured to memorize each of the detected first operating positions, wherein the first operation includes operation for pointing a position on the operation face, and the operating position detector detects the pointed position on the operation face as one of the first operating positions, the first operation of pointing at least one position on the operation face is operation in which a plurality of fingers simultaneously touch a plurality of positions on the operation face, and the operating position detector detects a region and a periphery thereof, which the plurality of fingers touch, or the operating position detector detects either the region or the periphery thereof, which the plurality of fingers touch, as one of the first operating positions;

a function correspondence making section configured to make each of the plurality of first operating positions detected before respectively correspond to a predetermined function based on the positional relation;

an operational detector configured to detect a second operation for each of the plurality of first operating positions; and a function execution controller configured to control an execution of the function which is made to correspond to the plurality of first operating position on which the second operation is conducted.

20. A function control unit comprising:
an operating position detector configured to detect a plurality of first operating positions at which a plurality of first operations by fingers of a user are conducted on an operation face on which operation is received from fingers of the user;

a finger recognizing section configured to recognize positions where the respective fingers are placed, based on a positional relation among the first operating positions detected by the operating position detector;

a function correspondence making section configured to make information of each of the fingers recognized by the finger recognizing section correspond to a predetermined function;

an operation detector configured to recognize a finger of the user and to detect a second operation by the finger; and a function execution controller configured to control an execution of a function set to the second operation by the operation detector, based on information of a finger which is made to correspond to the second operation by the function correspondence making section.

* * * * *